J. H. BARR.
TYPE WRITING MACHINE.
APPLICATION FILED APR. 28, 1914.
1,130,875.
Patented Mar. 9, 1915.
5 SHEETS—SHEET 1.
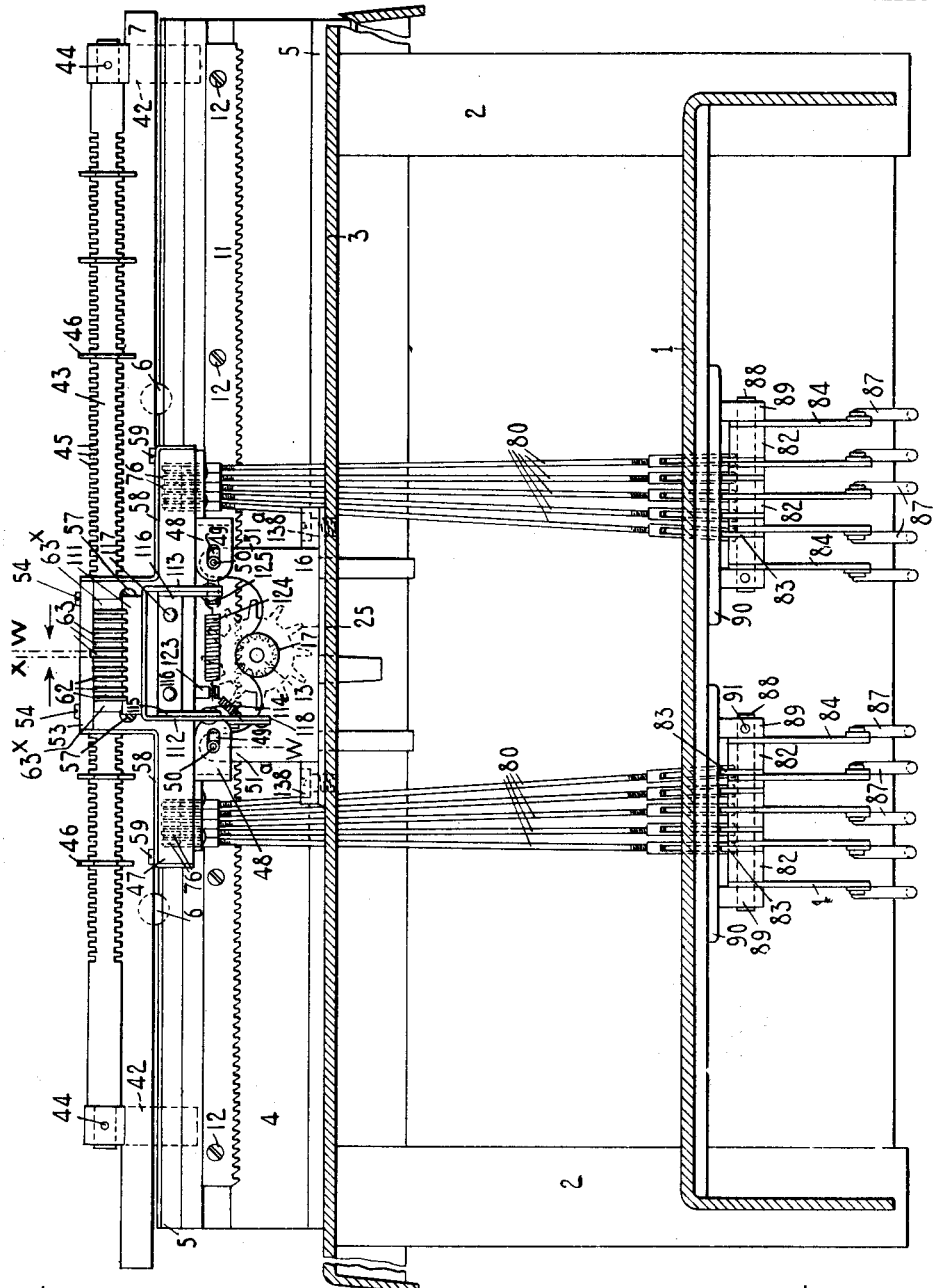
FIG. I.
WITNESSES:
INVENTOR:
John H. Barr
By Jacob Felbel
HIS ATTORNEY

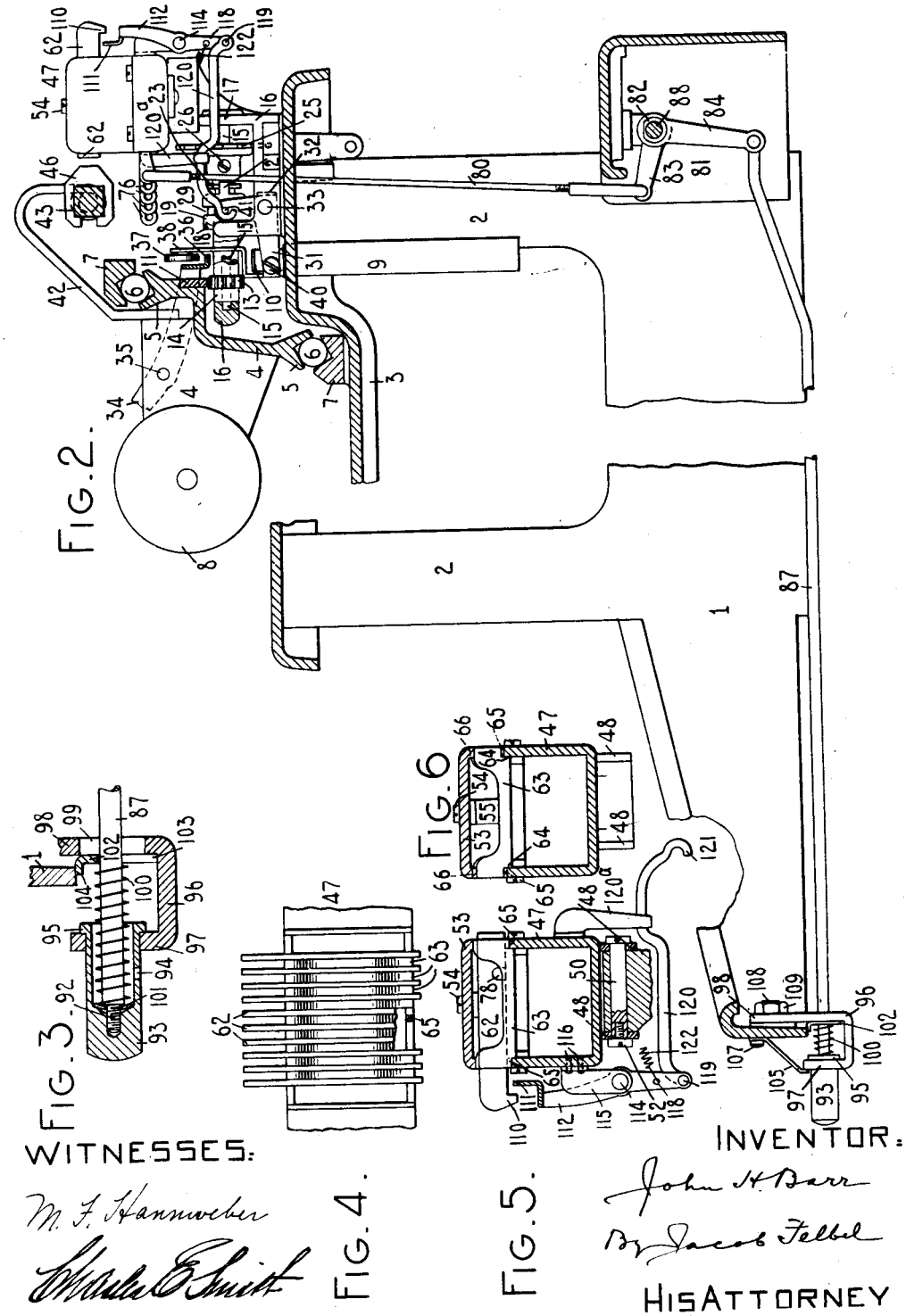

J. H. BARR.
TYPE WRITING MACHINE.
APPLICATION FILED APR. 28, 1914.
1,130,875.
Patented Mar. 9, 1915.
5 SHEETS—SHEET 3.
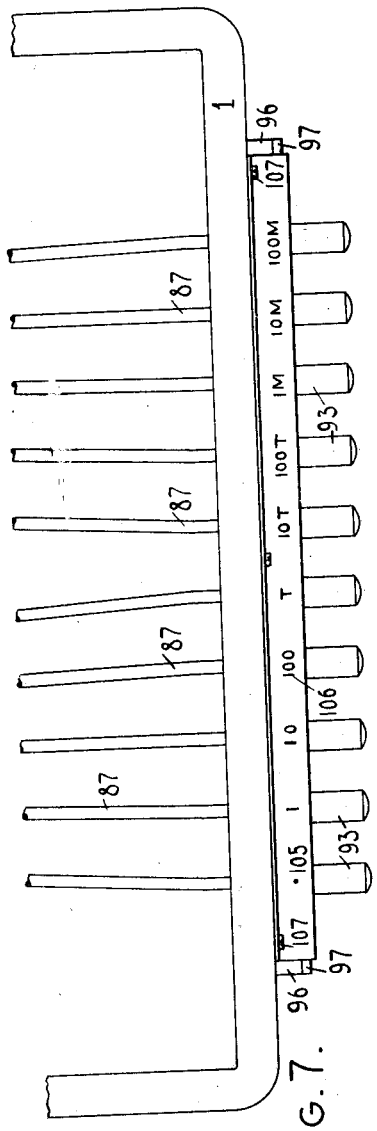
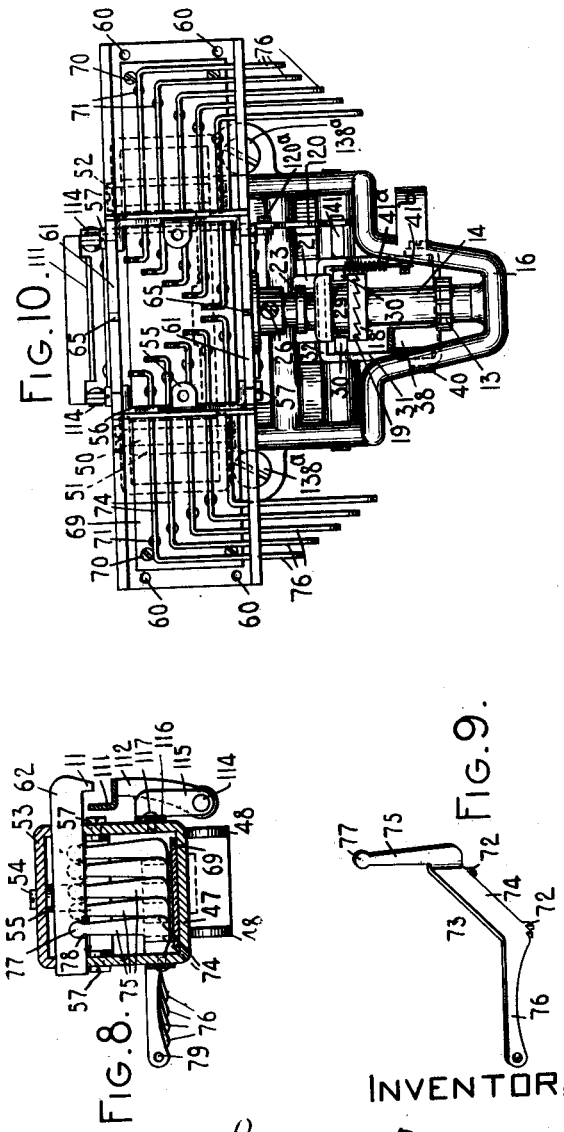
WITNESSES:
INVENTOR:
John H. Barr
By Jacob Felbel
HIS ATTORNEY

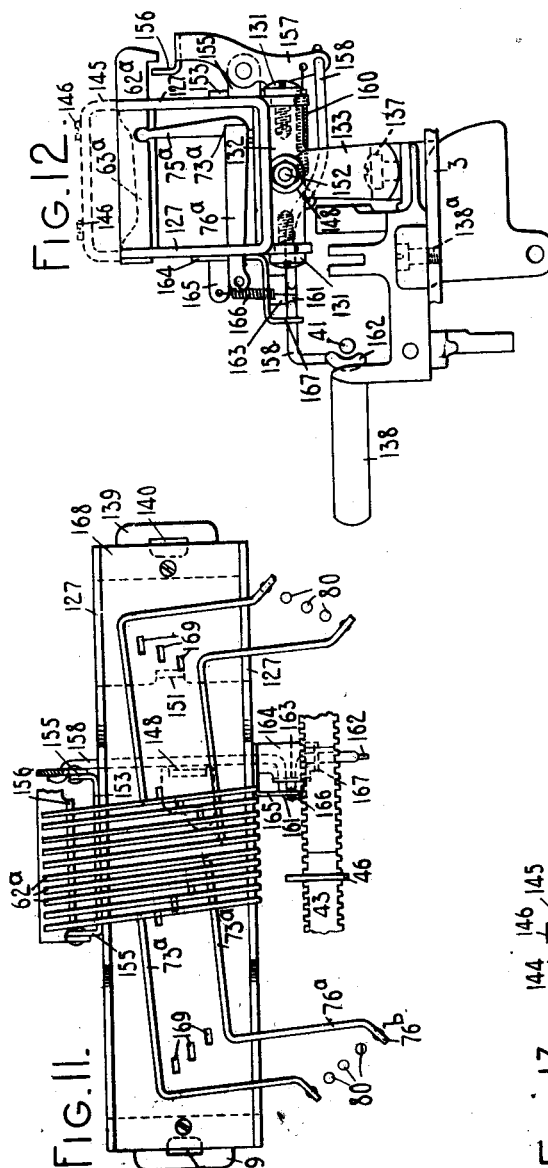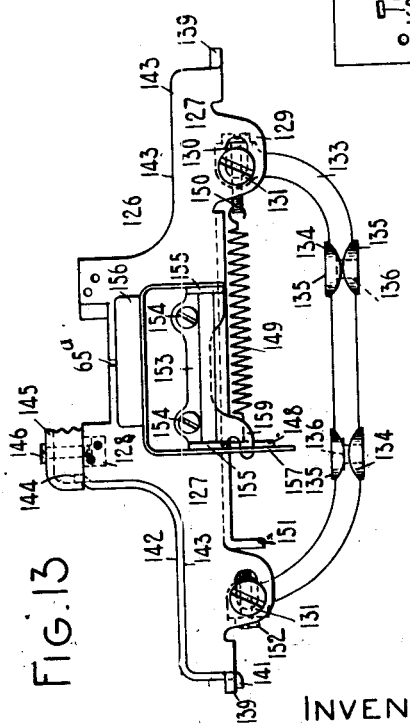

J. H. BARR.
TYPE WRITING MACHINE.
APPLICATION FILED APR. 26, 1914.
1,130,875.
Patented Mar. 9, 1915.
5 SHEETS—SHEET 5.
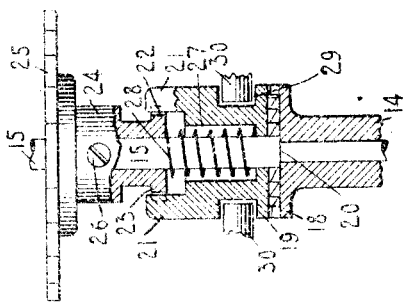
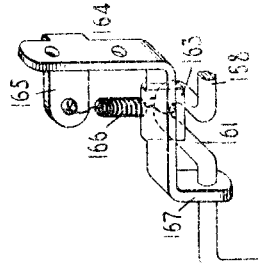
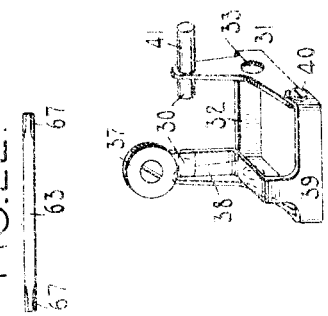
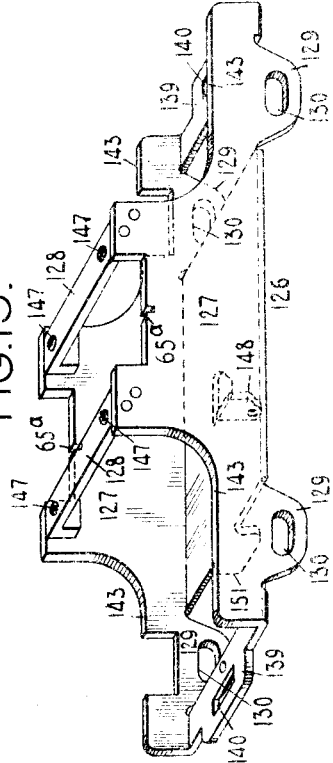
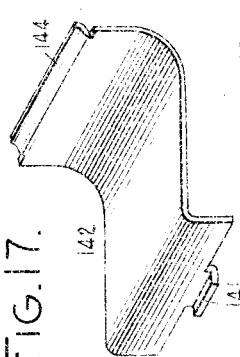
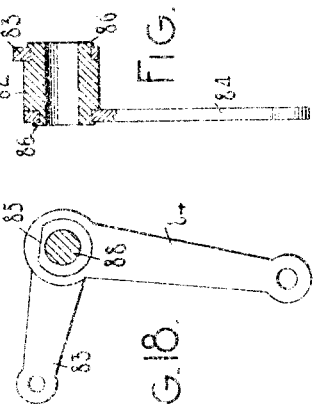
WITNESSES:
M. F. Hanauer
W. W. E. Smith
INVENTOR:
John H. Barr
By Jacob Felbel
HIS ATTORNEY

UNITED STATES PATENT OFFICE.

JOHN H. BARR, OF NEW YORK, N. Y., ASSIGNOR TO REMINGTON TYPEWRITER COMPANY, OF ILION, NEW YORK, A CORPORATION OF NEW YORK.

TYPE-WRITING MACHINE.

1,130,875.   Specification of Letters Patent.   Patented Mar. 9, 1915.

Application filed April 28, 1914. Serial No. 834,888.

*To all whom it may concern:*

Be it known that I, JOHN H. BARR, citizen of the United States, and resident of the borough of Manhattan, city of New York, in the county of New York and State of New York, have invented certain new and useful Improvements in Type-Writing Machines, of which the following is a specification.

My invention relates to typewriting machines and more particularly to tabulating mechanism therefor.

The objects of the invention, generally stated, may be said to be as follows: (a) To provide a comparatively simple tabulating mechanism which occupies but little space, and the parts of which may be manufactured at small cost and readily assembled, and a tabulator produced which is simple to operate and efficient in use. (b) To provide an improved tabulating mechanism in which backward or "reverse" as well as forward tabulation may be readily effected. (c) To provide tabulating mechanism in which parts thereof may be readily arranged to accommodate the mechanism to different characters of letter space feed of the carriage. (d) To provide a tabulating mechanism in which a disengagement between the stops may be more easily effected than heretofore, and in which therefore there is less liability of a projected stop being unintentionally held in its projected position. (e) To provide a tabulator which enables access to be readily gained to different parts thereof and enables the parts to be readily dismounted and replaced when desired.

To the above and other ends which will hereinafter appear, my invention consists in the features of construction, arrangements of parts and combinations of devices set forth in the following specification and particularly pointed out in the appended claims.

In the accompanying drawings wherein like reference characters indicate like parts in the different views, Figure 1 is a rear elevation partly in section of one form of typewriting machines embodying my invention, only so much of the machine being shown as may be necessary to illustrate my invention in its embodiment therein. Fig. 2 is a fragmentary vertical fore and aft sectional view of the same with parts broken away. Fig. 3 is an enlarged detail sectional view of one of the tabulator keys and some of the associated parts, the section being taken longitudinally through the key. Fig. 4 is a fragmentary top plan view with parts broken away of the denominational stops, spacing plates and housing. Fig. 5 is a fragmentary vertical sectional view of the denominational stops and some of the associated parts, the section being taken on the line w—w of Fig. 1 and looking in the direction of the arrow at said line. Fig. 6 is a sectional view corresponding to Fig. 5 but taken in the plane of the next adjacent spacing plate to the right, as the parts appear in Fig. 1, and with some of the parts shown in Fig. 5 omitted. Fig. 7 is a fragmentary top plan view showing the tabulator keys and some of the associated parts. Fig. 8 is a detail vertical fore and aft sectional view taken through the tabulator housing and showing the denominational stops and some of the associated parts, the section being taken on the line x of Fig. 1 and looking in the direction of the arrow at said line. Fig. 9 is a detail perspective view of one of the actuating devices for the denominational stops. Fig. 10 is a detail top plan view of a part of the tabulator mechanism and some of the associated parts, the view illustrating the parts as they appear when the cover plates are removed from the tabulator housing. Fig. 11 is a detail plan view showing a modified form of tabulating mechanism, the view representing the parts as they appear when the cover plates of the housing are removed. Fig. 12 is an end view of the same. Fig. 13 is a rear elevation showing part of the mechanism illustrated in Figs. 11 and 12. Fig. 14 is a detail top plan view of a bearing or spacing plate such as is shown in Fig. 11 but provided with differently spaced bearing openings. Fig. 15 is a detail perspective view of the sheet metal body portion of the tabulator housing shown in Figs. 11 to 13, inclusive. Fig. 16 is a detail perspective view of the modified form of releasing device also shown in Figs. 11 and 12 and the supporting bracket therefor. Fig. 17 is a detail perspective view of one of the sheet metal cover plates for the housing shown in Fig. 15. Figs. 18 and 19 are side and sectional views respectively of one of the bell cranks to which a tabulator push rod is connected. Fig. 20 is a detail perspective view of one of the members of the hand actuated carriage releasing means.

Figs. 21 and 22 are detail side and bottom edge views respectively of one form of center spacing plate which has an interlocking connection with the housing. Fig. 23 is a detail horizontal sectional view taken through the escapement wheel shaft and showing the clutch by which the carriage may be released from control of the escapement mechanism.

While I have shown my invention in the present instance embodied in a front-strike typewriting machine it should be understood that the invention is applicable to and may be embodied in various styles of typewriting machines.

The frame of the machine comprises a base 1, corner posts 2 and a top plate 3. A carriage 4 has oppositely grooved guide rails 5 which receive anti-friction balls or rollers 6, the latter also being received in oppositely grooved fixed guide rails 7 secured to the top plate of the machine. The carriage supports a cylindrical platen 8 against the front face of which upwardly and rearwardly striking type bars (not shown) are adapted to strike. The carriage is thus mounted for movement from side to side of the machine over the top plate under the power of a spring drum 9 connected with the carriage through a band 10.

The movement of the carriage under the power applied thereto by the spring drum is controlled by suitable escapement mechanism which in the present instance comprises a feed rack 11 fixed by screws 12 to the carriage. This feed rack meshes with a feed pinion 13 carried by and formed as a part of a sleeve 14 which is adapted to turn on a shaft 15. The forward end of this shaft is seated in a bearing opening in a fixed bracket or casting designated as a whole by the reference numeral 16, as shown in Fig. 2. The rear end of the shaft 15 is received in a bearing opening in an upright arm or web 17 of the casting or bracket 16. From an inspection of Figs. 10 and 23 it will be seen that the sleeve 14 at its rear end is formed as a clutch section 18, the ratchet teeth of this clutch engaging corresponding ratchet teeth of a coöperating clutch section 19. As hereinbefore explained the sleeve 14, feed pinion 13 and clutch member 18 are free to turn on the shaft 15 unless constrained to turn with the shaft through the engagement of the clutch members 18 and 19. The sleeve 14 is prevented from moving longitudinally along the shaft 15 in one direction by the engagement of the sleeve with the bracket member 16, whereas the rear end of the sleeve co-acts with a circumferential shoulder 20 (see Fig. 23) on the shaft 15 to prevent a movement of the sleeve 14 longitudinally of the shaft in the opposite direction. The circumferential shoulder 20 is formed at the junction between the body portion of the shaft 15 and the reduced forward end portion thereof. The clutch section 19 receives a bearing on the shaft 15 and is fixed to turn with the shaft but may be moved longitudinally thereof, as will be understood from an inspection of Fig. 23. Thus it will be seen that the clutch member 19 is provided with two rearwardly projecting fingers 21 on opposite sides thereof. These fingers constitute splines which extend through slots 22 formed in a circular flange 23 which projects from the hub 24 of an escapement wheel 25. The escapement wheel is fixed to the shaft 15 by a screw 26 which is received in a tapped opening in the hub and bears at its inner end against the shaft 15. The clutch section 19 has a central opening, chamber or recess 27 therein and in which a coiled expansion spring 28 is received. The forward end of the spring bears against the bottom wall of the recess 27 of the clutch member 19, whereas the rear end of the spring bears against the hub 24 of the escapement wheel. The spring 28 thus tends to maintain the clutch member 19 in effective engagement with its companion clutch member 18 to lock the escapement wheel and feed pinion to turn together during a letter feed movement of the carriage and when a step-by-step feed movement of the escapement wheel is afforded by the usual feed dogs, not shown. When, however, the clutch section 19 is moved rearwardly against the force of the spring 28 the clutch section 19 is disengaged from the section 18 and the feed pinion and sleeve 14 are free to turn on the shaft 15 while the shaft and escapement wheel remain at rest. At this time the carriage is freed from control of the escapement mechanism, as for instance, when a tabulating operation takes place.

A release of the clutch 19 is effected in the following manner: A circumferential groove 29 is formed in the member 19 to receive oppositely disposed pins 30. From an inspection of Figs. 2, 10 and 20, and more particularly from the last mentioned figure, it will be seen that these pins project in opposite directions from a release frame or device, designated as a whole by the reference numeral 31. The frame 31 is in the nature of two sheet metal bell crank levers united by an integral cross bar 32. The release frame is pivoted at 33 to the casting 16 and in its pivotal movement is adapted to throw the clutch member 19 rearwardly and disengage it from the clutch member 18.

I have provided hand actuated carriage releasing means coöperative with the release frame 31 as well as automatically operating means controlled by the tabulator to operate said frame and the clutch controlled thereby. The hand actuated carriage release is shown in Figs. 2 and 20 from which it will be understood that levers 34 are pivoted at 130

35 to the end plates of the carriage and are united at their rear ends by an angle bar 36 which extends throughout the length of the carriage. One of the levers 34 is extended forwardly from its pivots and is provided with a finger piece by which the bar 36 may be elevated, although, if desired, both of the levers 34 may be provided with finger pieces, one arranged at each side of the carriage. An anti-friction roller 37 is carried on an upright arm 38 of a sheet metal yoke 39 which is pivoted at 40 to the release frame 31. It will be understood, therefore, that a depression of either of the carriage release keys is effective to elevate the bar 36, carrying with it the roller 37 and yoke 39 and causing the release frame to be rocked on its pivot 33 to release the clutch member 19 and thus free it from engagement with the clutch member 18, so that the carriage is freed from control of the escapement mechanism. The right-hand pin 30 of the release frame is extended beyond and to the right of the frame to provide a pin 41 by which the release frame may be rocked at an actuation of the tabulator mechanism, as will hereinafter clearly appear. From an inspection of Fig. 10 it will be seen that a contractile spring 41ᵃ is connected at one end to the right-hand pin 30 and at its opposite end to a pin 41ᵇ which extends inwardly from the forwardly extending bracket arm of the casting 16. The force of this spring is exerted to return the releasing frame 31 and the parts connected therewith to normal position, whether the releasing frame be actuated by the hand operated release referred to above or by the operation of the tabulating mechanism.

The tabulator mechanism of my present invention is constructed as follows: Bracket arms 42 are fixed to the carriage and extend upwardly and rearwardly therefrom and are formed at their ends with bearings for a column stop bar 43, said bar being fixed in its bearings in the bracket arms by pins 44. The upper and lower sides of the bar 43 are formed with teeth 45 adapted to receive sheet metal bifurcated column stops 46 in the spaces between said teeth.

A tabulator housing, designated as a whole by the reference numeral 47, is preferably made of sheet metal, the body portion thereof being substantially U-shaped in cross section as will be seen from an inspection of Figs. 5, 6, 8 and 10. This housing is provided with depending brackets 48 which, as shown in Fig. 1, are slotted at 49 to receive supporting and guide pins 50 which extend through bearings in bracket arms 51 of the casting 16. Each of the guide pins 50 is tapped at one end to receive a headed screw 52, which screws with the headed ends of the pins hold the pins in place and properly support the housing and afford a limited movement thereof in the direction opposite the letter feed of the carriage for an extent corresponding to the length of the slots 49, for purposes which will hereinafter appear. It will be understood that by removing the screws 52 the pins 50 may be withdrawn and the housing, together with the parts carried thereby, may be detached from the machine. The body portion of the housing is so constructed that it is closed at the bottom and front and rear sides thereof but is open at its ends and at the top thereof. The ends and the top of the housing are closed by three cover plates, one a centrally disposed cover plate 53 which is secured in position by headed screws 54, the stems of which are received in threaded openings in inwardly projecting ears 55 which project from cross braces 56 secured to the body portion of the housing by screws 57, as best shown in Fig. 10. Each of the other cover plates 58 is secured in place by headed screws 59 which are received in tapped openings 60 in the body portion of the housing. It will be understood that by removing the cover plates 53 and 58 access may be gained to the interior of the housing and to the parts contained therein. From an inspection of Figs. 4, 5, 6, 8 and 10 it will be understood that the central portion of the body of the housing is cut out, as represented at 61, at both sides thereof, the lengths of such cut-outs corresponding to the width of the entire series of denominational stops 62. The cover plate 53 is likewise cut out in a like manner at its front and rear edges to provide corresponding cut-outs for the reception of the denominational stops. The stops are maintained spaced apart by spacing plates 63 which, as shown in Fig. 6, are formed with shoulders 64 which engage the inner walls of the body of the housing to prevent longitudinal displacement of the spacing plates. The body portion of the housing is provided with a centrally located notch 65 in the front and also in the rear wall of the cut-out portion thereof, and in which notches the central spacing plate 63 may be seated in order to hold it against lateral movement in the cut-outs. Like notches 66 are provided in the edges of the cover plates 53 of the casing, so as to receive the upper edge of the center spacing plate and thus provide an additional means for preventing a lateral movement of the center plate.

It will be understood that when the cover plate 53 is removed any one or all of the denominational stops 62 and the spacing plates 63 may be lifted out and removed from the machine. The object of this construction is to enable the denominational stops to be variably spaced apart according to the letter space feed of the carriage in which the tabulator is employed. If, for example, the feed of the carriage is such as to afford a movement of, say, one-tenth of an inch at each letter space movement thereof, then spacing plates of the requisite thickness to correspond thereto will be employed between the denominational stops. If, however, the feed of the carriage at each letter space movement thereof be, say, one-twelfth of an inch, then thinner spacing plates 63 will be employed to provide a more compact arrangement of the denominational stops and make the spacing thereof accord with the different character of letter feed movement of the carriage. In this event relatively thick end spacing plates 63˟ (see Fig. 1) will be employed to fill out the space between the end walls of the cut-outs 61 in the housing. In the present instance I have shown two different characters or thicknesses of spacing plates, one character of spacing plates being shown in Fig. 1 and thicker spacing plates being shown in Fig. 4. It will be understood that all of the spacing plates 63 are of like contour but of different thicknesses, except the center interlocking plate of the thicker series of spacing plates. One of these last mentioned plates is shown in detail in Figs. 21 and 22 from which it will be seen that the portions 67 and 68 which engage in the notches 65 and 66, respectively, are thinner than the body portions of the plates and are formed by reducing the metal at the engaging portions as, for example, by milling cuts. The notches 65 and 66 are each of a width to correspond to the thickness of the thinner spacing plate, but by reducing the thickness of the thicker center spacing plate at those portions thereof which engage in said notches, the same notches may be employed for center plates of different thicknesses. By thus providing interchangeable spacing plates interposed between the denominational stops, the latter may be readily spaced to accord with the spacing or letter feed of the carriage, it merely being necessary to substitute spacing plates of one thickness for spacing plates of a different thickness. The denominational stops, it will be understood, are free to be moved fore and aft of the machine and to extend through the cut-outs in the body of the housing and its cover plate 53 so that any denominational stops may be projected forwardly into the path of the column stops 46 on the carriage.

The means for actuating or projecting the denominational stops are as follows:—From an inspection of Figs. 8, 9 and 10 it will be observed that a spacing or bearing plate 69 is secured to the bottom of the trough-like body portion of the housing by screws 70, so that the plate may be readily detached when desired. This bearing plate has a number of bearing apertures 71 having an echelon arrangement. These bearing openings, as shown in Fig. 10, merely consist of circular holes bored through the plate, there being four series of apertures and five apertures in each series. The apertures on one side of the center of the plate are stepped in one direction and those on the opposite side are stepped in the opposite direction, as will be clearly understood from an inspection of Fig. 10. Each companion pair of bearing apertures 71 in the bearing or spacing plate 69 is provided to receive bearing projections 72 which project from one edge of a sheet metal actuating member, designated as a whole by the reference numeral 73 and shown in detail in Fig. 9. Each of these actuating members has an elongated body portion 74 which extends in the general direction of the travel of the carriage and has projecting from its body portion widely separated crank arms 75 and 76 which extend at right angles to each other and at right angles to the body portion of the actuating member. By this construction each of the actuating members has its bearing points 72 at one edge of the body portion 74 arranged to be seated in a pair of bearing apertures 71 in the spacing plate 69. Said apertures are spaced apart to receive the bearing projections and the lower ends of said projections bear against the bottom wall of the housing and afford a pivotal or rocking movement of each of the actuating members. Each actuating member has its upwardly extending arm 75 rounded at 77 for reception in a cut-out portion or aperture 78 in the associated denominational stop 62, so as to effect an operative connection between each actuating device and its associated denominational stop. All of the actuating devices 73 are made from the same character of blanks and are of the same size, although those on opposite sides of the center are made as rights and lefts, each set of five at one side of the center being alike. The forwardly projecting arm 76 on each actuating device extends through a slot in the front wall of the housing and is provided at its forward end with an opening 79 by which it may be detachably connected to a depending link 80.

The lower end of each link 80 is detachably connected to a bell crank, designated as a whole by the reference numeral 81. Each of these bell cranks, except two of the series, is constructed as represented in detail in Figs. 18 and 19. From these figures it will be seen that each bell crank comprises a hub 82 reduced at the ends thereof to receive crank arms 83 and 84. Each reduced end of the hub is flattened at one side thereof, as indicated at 85, to provide positive connection between the hub and the crank arms, so as to cause the parts to move together. The crank arms are secured in place on the hub by riveting each end of the hub, as indicated at 86. The off-set crank arms 83 and 84 are thus arranged on each of the bell cranks in question in order to properly connect with the upright links 80 and with forwardly projecting push rods 87, which latter are connected to the depending crank arms 84 of the bell cranks. From an inspection of Fig. 1 it will be seen that the upright links 80 are arranged in two series on opposite sides of the center of the machine and extend upwardly where they make connection with the forwardly projecting crank arms 76 of the actuating devices 73. From a consideration of Figs. 1 and 7 it will also be understood that while the forward ends of the push rods are spaced apart at equal distances, five rods on each side converge toward each other as the rear ends thereof are approached. The rods are therefore divided at the rear ends in two series where they make connection with the crank arms 84 of the two separated series of bell cranks 81. As will be understood from an inspection of Fig. 1 each series of bell cranks 81 has a pivot rod 88 which extends through the hubs thereof and is seated in bearings in depending arms 89 of a bracket 90 secured to the base of the machine. Each pivot rod 88 is secured in place by a pin 91 which extends through one of the depending bracket arms and through the pivot rod. A separate bracket 90 is provided for each set of five bell cranks and the center bell crank of each series is preferably formed as a single-piece, flat, sheet metal member without a hub and one which receives a direct bearing on the pivot rod. The remainder of the bell cranks of each series, however, are provided with the hubs 82 by which the arms 83 and 84 of each bell crank are off-set as represented in detail in Figs. 18 and 19. From a consideration of Figs. 1 and 10 it will be understood that the widely separated crank arms 75 and 76 of each actuating device provides off-set connections which enable the upright links 80 to be effectively and operatively connected with the push rods 87 and with the denominational stops 62, notwithstanding the fact that the latter are confined in a comparatively small widthwise space at the center of the machine and that the push rods extend at the keyboard throughout a considerable portion of the width of the machine.

The forward end of each push rod 87 is threaded at 92 for coöperation with a tapped opening in a finger key or tabulator key head 93. Each key head is in the form of a cylinder closed at its outer end and provided with a spanner opening 94 for coöperation with a spanner wrench, and with the aid of which each key head may be screwed onto the threaded end of the associated push rod 87. The inner end of each key head is provided with an outwardly extending circumferential flange 95. A fixed sheet metal guide 96 is provided for coöperation with the different key heads 93. This guide is bent up into substantial U-shape providing front and rear parallel walls 97 and 98 respectively. The front wall 97 is apertured throughout the length thereof to receive the cylindrical key heads and guide them during the operation of the keys, each cylindrical opening in the forward wall of the guide being of a size sufficient to receive the body portion of one of the key heads but to prevent the flange 95 thereon from passing through the guide opening. The rear wall 98 of the guide is also apertured throughout the length thereof, an aperture 99 being provided for each of the apertures in the front wall of the guide. Each pair of apertures in the front and rear walls are in register to enable the push rod connected to each key head to pass through the registering apertures in the rear wall of the guide. Moreover, each aperture 99 is of sufficient size not only to receive the body portion of the key head but to permit the flange 95 thereon to pass through the aperture, so that the key heads may be inserted in the guide from the rear through the apertures 99 and into the registering openings in the front wall of the guide. An expansion spring 100 surrounds each push rod 87 and bears at each forward end against a washer plate 101 which has a central opening therein through which the threaded end of the associated push rod extends. The force of the spring is thus exerted at its forward end against the associated key head to force it forward in its guide opening until arrested by the flange 95 which bears against the inner wall of the guide, as represented in Fig. 3. The rear end of the spring is adapted to bear against a plate, designated as a whole by the reference numeral 102. This plate is slotted at 103 throughout its length and at intervals which correspond to the positions of the push rods 87. These slots extend from one edge of the plate to points near the upper edge portion thereof so that the plate may be inserted in the guide, between the front and rear parallel walls thereof, and a push rod will be received in each of the slots 103. The upper edge of the plate 102 is bent forwardly, as indicated at 104, where it is received beneath the lower edge of the front cross bar of the base 1 of the machine. The plate 102 thus inserted in place constitutes a bearing plate against which the rear end of each spring 100 is adapted to bear, the force of the springs against the plate 102 being resisted by the rear wall 98 of the guide 96. It will be understood that by this construction the parts may be readily assembled and that the construction is a simple and effective one for guiding the key heads and for providing spring means for returning the key heads and the parts connected therewith to normal position.

The index plate 105 of the tabulator is preferably made of a single piece of sheet metal with the indices 106 inscribed thereon. This plate is secured to the base of the machine by screws 107, the plate being bent forwardly over the guide and overlapping the upper edge of the front wall thereof, as represented in Fig. 2, thus acting as a shield to cover the springs and key heads in the rear of the front wall of the guide. The guide 96 may be secured to the base of the machine in any suitable manner. As indicated in Fig. 2 the rear wall 98 thereof is extended upwardly and is apertured to receive screw bolts 108 which coöperate with nuts 109 to secure the guide to the base of the machine.

The release of the carriage is effected at each tabulating operation by the following means:—Each of the denominational stops 62 is provided with a depending engaging member 110 at the rear end thereof. Each of these engaging members is adapted to coöperate with a universal release bar 111 which is preferably formed of sheet metal and constitutes a part of a yoke-like member including parallel arms 112, 113. These arms are pivoted at 114 to depending arms 115 of a sheet metal bracket having a cross bar 116 which unites the bracket arms 115. This bracket is riveted as at 117 (Fig. 8) to the body portion of the tabulator housing. The arm 112 of the release member is extended downwardly beyond its pivot (see Fig. 5) to provide an arm 118 pivotally connected at 119 to a sheet metal releasing member or link 120 which extends forwardly beneath the tabulator housing and is provided with a hook-like engaging portion 121 at the forward end thereof. A sheet metal bracket 120* is fixed to the housing and is formed with a hook-like bearing portion at the lower end thereof to receive and guide the forward end of the link 120 in its fore and aft movement, and to cause the link to be shifted bodily with the housing in the bodily movement of the latter, as will hereinafter more clearly appear. As indicated in Figs. 2 and 10, the hook-like engaging end of this releasing link 120 is arranged to coöperate with the pin 41 on the releasing frame 31. A contractile spring 122 is connected at one end to the arm 118 of the universal bar frame and at its other end to a pin 123 (see Fig. 1) which is connected to and extends downwardly from the bottom of the tabulator housing. This spring is effective to return the universal release bar 111 and the parts connected therewith to normal position.

From the foregoing description it will be understood that an actuation of one of the denominational or tabulator keys 93 is effective, through the members 87, 81 and 80, to operate the associated actuating device 73 and effect a forward movement of the associated denominational stop 62. During this movement of the denominational stop to its projected position the universal release bar will be taken up and moved forwardly, thus effecting a rearward movement of the releasing link 120. This movement of the releasing link is effective to turn the releasing frame 31 on its pivots, thus moving the clutch section 19 rearwardly to release the carriage from the control of its escapement mechanism, as hereinbefore explained. When pressure on the actuated tabulator key is released the associated springs 100, 122, 41* and 28 will return the parts to normal position, the carriage in the meantime having been arrested by the coöperation of the projected denominational stop with one of the column stops 46.

It will be understood from the foregoing description that an actuation of a tabulator key is operative to project the associated denominational stop and to release the carriage and enable it to travel under the power of the spring drum in the direction of its feed until arrested by the coöperation of the projected denominational stop with the first of the column stops 46. However, I have provided means whereby a backward or "reverse" tabulation may be effected when desired, and by which the carriage may be arrested at the same denominational or letter space position whether the carriage be arrested under a forward or a backward tabulation. As hereinbefore explained, the tabulator housing which carries the denominational stops, the actuating members 73 therefor, and the carriage releasing devices 111 and 120 is adapted to move for a limited distance to the right from its normal position. The extent of this movement of the housing and the parts carried thereby is sufficient to compensate for the thickness of the coacting stops, so that when the carriage is arrested in its backward movement by the tabulator mechanism and through the coöperation of the same tabulator stops, the housing and the parts carried thereby will be shifted to the right and the carriage will be arrested in the same letter space position that it would be by the coöperation of the same stops in effecting an arrest of the carriage at a forward tabulation. From an inspection of Fig. 1 it will be understood that the housing and the parts carried thereby are normally maintained to the left (or to the right as the parts appear in Fig. 1) by a contractile spring 124 which is connected at one end to the pin 123 on the housing, and which has been hereinbefore referred to. The opposite end of the spring is connected to a pin 125 which projects from the casting 16. During the backward or reverse tabulation the tabulator housing and the parts carried thereby are moved against the power of the spring 124 until the housing and the carriage are arrested. When pressure is released on the tabulator key and the denominational stop is withdrawn, the housing and the parts carried thereby are returned to normal position by the spring 124.

From the foregoing description it will be understood that the housing is mounted to receive a limited movement in the general direction of the line of travel of the carriage and in one direction, or in the present instance, toward the right from the normal position.

In order to maintain the carriage in the position to which it is pushed by hand against the power of the spring drum and arrested during reverse tabulation, I have provided means for automatically restoring the carriage to the control of the carriage feed mechanism at about, or just prior to, the time when the carriage is arrested in its backward movement. Thus, from an inspection of Figs. 2 and 10, and more particularly from the last mentioned figure, it will be understood that as the housing, with the parts carried thereby, is taken up and moved to the right when a column stop coacts with the projected denominational stop during a backward tabulation, the releasing member 120 will be moved to the right with the housing and said releasing member will be tripped or moved off the pin 41. The springs 41ª and 28 will then be effective to bring about a reengagement between the clutch members 19 and 18, thus restoring the carriage to the control of its escapement mechanism. This assures a maintenance of the carriage in the position to which it has been moved to the right by hand and arrested through the coöperation of the tabulator stops, and there is no liability of the carriage being accidentally moved from such position by the power of the spring drum.

While I have shown the feed rack 11 and feed pinion 13 with inclined teeth, it should be understood that in practice I prefer to employ straight or standard teeth on the rack and pinion, when a disengaging clutch such as 19 is used instead of a lifting rack.

In Figs. 11 to 17, inclusive, I have shown a modified form of construction and one which I prefer to employ in practice. In this preferred form of construction, the operation of the parts is similar in many respects to the operation of the corresponding parts in the previously described construction. Referring more particularly to Fig. 15, which shows in detail the body portion of the tabulator housing, it will be observed that this member is struck up from a single piece of sheet metal and, like the body portion of the housing of the previously described construction, is substantially U-shaped in cross section. The body portion of the housing is designated as a whole by the reference numeral 126 and comprises front and rear walls or sides 127 united by brackets 128 and formed with depending lugs or ears 129. These ears are slotted at 130 to receive headed, shouldered bearing screws 131 which are received at their threaded ends in tapped openings in cross pieces 132, of a supporting member 133. The cross heads 132 extend between the ears 129 beneath the housing, as clearly shown in Fig. 12, and the support 133 as a whole is substantially C-shaped as indicated in Fig. 13 and has enlarged portions 134 with flattened upper and lower faces 135. These portions are apertured at 136 to receive headed screws 137, which latter are received at their threaded ends in tapped openings in a bracket or casting, designated as a whole by the reference numeral 138. The casting or bracket 138, together with the supporting member 133 detachably connected therewith, correspond to the bracket or casting 16 in the previously described construction, and like the casting in that construction is intended to support the escapement wheel shaft and the parts connected therewith. In both instances these castings are supported on the top plate of the machine and are secured thereto by screws 138ª, portions of the casting extending downwardly below the top plate through an opening formed therein. The body portion of the housing 126 is also provided at its ends with ears 139 which are slotted at 140. These slotted ears are provided to receive the bent ends or tongues 141 of two cover plates, each designated as a whole by the reference numeral 142 and one of which is shown in detail in Fig. 17. Each of these cover plates is formed, as indicated in Fig. 17, and when in place is adapted to rest on the edges 143 of the body portion of the housing 126 and to close a part of the upper side of the housing and also one end thereof. It will be seen that each of these cover plates 142 is likewise provided with a bent tongue 144 which, as will be understood from an inspection of Fig. 13, is adapted to be received within a third or centrally disposed cover plate 145. Moreover, it will be understood that when the cover plate 145 is secured in place the two cover plates 142 at the sides thereof are secured against detachment. When, however, the cover plate 145 is removed each of the cover plates 142 is free to be turned on its tongue and slot connection 141—140 as a hinge until it is in a position where it may be lifted and removed from the body portion of the housing. The centrally disposed cover plate 145 may be secured in place by headed screws 146 which are received at their threaded ends in tapped openings 147 in the cross bars or brackets 128. By removing the screws 146 the cover plates 145 and 142 may be detached and removed from the body portion of the housing.

One of the advantages of making the members 133 and 138 in two pieces and detachably connecting them, instead of making them as one casting or piece as in the previously described construction, is that a removal of the screws 137 enables the tabulator housing and the parts carried thereby to be readily detached and a different character of tabulating mechanism, such as a column selector, to be substituted therefor. The body portion of the housing 126 is also formed with a bracket or ear 148 by means of which one end of a contractile spring 149 may be connected to the housing. The opposite end of this spring is connected to a screw 150 which passes through a threaded opening in the left-hand cross head 132 of the supporting member 133. The power exerted by the spring may be varied by an adjustment of the screw 150. The body portion of the housing is also formed with a depending stop or ear 151 which coöperates with a stop 152 which is in the nature of a set screw adjustable in a tapped opening in the right-hand cross head 132 of the support. The stops 151 and 152 coöperate to limit the movement of the housing relatively to its support 133 during a backward tabulation, or during a movement of the housing with the carriage when a reverse tabulation is effected. A sheet metal bracket 153 is secured to the body portion of the housing by screws 154. This bracket is provided with arms or ears 155 by which a universal bar or bail 156 is pivotally connected to the bracket. This universal bar has a depending arm 157 by which pivotal connection may be effected with a releasing member 158. The bracket 153 is likewise provided with a depending arm 159 which constitutes a stop with which the arm 157 of the universal release bar co-acts to limit the movement of the universal release bar and the parts connected therewith in one direction. From an inspection of Fig. 12 it will be observed that a contractile spring 160 is connected at one end to the depending arm 157 of the universal release bar and is connected at its opposite end to the ear 148 on the body portion of the housing. The power of this spring 160 is exerted to return the universal release bar and the parts connected therewith to normal position. The releasing member 158 is in the nature of a wire link provided with a bend 161 which forms a crank arm, as clearly shown in Fig. 16. The member 158 has a flattened portion 162 which is in the nature of a hook-like engaging member which co-acts with the releasing pin 41. The crank arm 161 of the releasing member is adapted to bear against the lower edge of a depending arm 163 of a sheet metal bracket, designated as a whole by the reference numeral 164, as clearly shown in Fig. 16. This bracket is secured to the front of the body portion of the tabulator housing and is provided with a forwardly extending arm 165 to which one end of a contractile spring 166 is connected, the opposite end of this spring being connected to the crank arm 161 to normally maintain the crank arm bearing against the lower edge of the stop or bracket arm 163. The bracket 164 is also provided with a depending arm or ear 167 apertured to receive the forward end portion of the releasing member 158, so that said member is free to move longitudinally in the bearing opening of the arm 167 and also to turn therein as will hereinafter more clearly appear. The pivotal connection between the member 158 and the universal releasing bar is such, as will be understood from an inspection of Fig. 11, as to afford a slight rotative movement of the member 158. When the universal release bar is actuated by one of the denominational stops 62, a longitudinal movement of the member 158 will be effected to actuate the releasing frame 31 through an engagement of the pin 41 thereon. During this fore and aft movement of the releasing member 158 the crank arm 161 coacts with the part 163 to prevent the member 158 from being turned on its longitudinal axis under the power of the spring 166. During a backward tabulation the member 158 has a bodily movement with the housing to the right, as in the previously described construction. The effect of this is to carry the engaging member 162 away from the pin 41 and release the latter and enable the carriage to be automatically restored to the control of its escapement mechanism. If the carriage should be quickly released by the hand of the operator, before the carriage has been restored to the control of the escapement mechanism, and an accidental engagement should be effected between the engaging portion 162 of the releasing member 158 and the end of the pin 41, this would result in turning the member 158 against the power of the spring 166 so as to prevent a blocking engagement between the parts 41 and 162 which might prevent a return movement of the pin 41 to normal position, and thus, through frictional resistance, prevent a restoration of the carriage to the control of its escapement mechanism. The pivotal movement of the member 158 thus effected is operative to move the crank arm 161 away from the abutment 163, but as soon as the pin 41 is restored to normal position, through the reëngagement of the clutch members 18 and 19, the power of the spring 166 is effective to turn the member 158 and bring the crank arm 161 against the abutment 163, thus restoring the member 158 to its normal position, rotatively considered. This pivotal movement of the member 158 and the means by which such pivotal movement is effected constitute in effect safety means for preventing a premature reëngagement between the part 162 and the pin 41 from blocking the parts and thereby preventing an automatic restoration of the carriage to the control of its escapement mechanism.

In the construction shown in Figs. 11 to 17, inclusive, the spacing plate 168 is similar to that employed in the previously described construction except that the bearing apertures or openings 169 therein are of different formation and are differently disposed in the plate. In this preferred form of construction the apertures 169 are punched out and are preferably in the nature of oblong slots which, as in the previously described construction, receive the bearing projections on actuating members 73ª. These actuating members are similar to those employed in the previously described construction, and illustrated in detail in Fig. 9, except for slight changes in detail. For example, the forward ends of the actuating arms 76ª are bent laterally as at 76ᵇ to provide a better clearance between the arms at the forward ends thereof and between the upper ends of the pull links 80 which are connected therewith. The upwardly extending arm 75ª of each actuating member 73ª is connected with a denominational stop in the same manner as in the previously described construction. It will be seen, however, that the pivotal axis of each of these actuating members, instead of extending at right angles to a vertically disposed plane extending fore and aft of the machine, is arranged at an oblique angle to said plane, and that the bearing apertures 169 have a corresponding arrangement although, as in the previously described construction, they have an echelon arrangement. By mounting the actuating devices 73ª in the manner described they are adapted to co-operate with the denominational stops 62ª which, as shown in Fig. 11, are in parallel vertical planes arranged at an angle to a vertical plane extending fore and aft of the machine. The plane of movement, therefore, of each of the denominational stops is at an oblique angle to the plane of each of the column stops 46 with which it co-acts. It will be understood that by this arrangement each denominational stop, as it moves rearwardly out of engagement with a column stop, also moves slightly to the left or in the general direction of the feed of the carriage. It will be seen, therefore, that a disengagement between a projected denominational stop and a column stop can be more easily effected than in an ordinary construction in which the disengaging movement is in a fore and aft vertical plane, or in a direction at right angles to the line of travel of the carriage. By reason of this disengagement of the denominational stop by a movement slightly to the left as well as to the rear, there is but little tendency for the power of the carriage, exerted through the engaged column stop, to prevent the projected and engaged denominational stop from being restored to normal position, even though a comparatively light spring be employed to return the denominational key and the stop controlled thereby to their normal positions.

In the form of construction shown in Figs. 11 to 17 inclusive, detachable spacing plates 63ª, similar to those previously described, are employed except that they have an angular disposition corresponding to the angular disposition of the denominational stops. Moreover, the tabulator frame is notched at 65ª, as in the previously described construction, for interlocking engagement with the center spacing plate. Furthermore, the cover plate 145 is notched in a like manner for co-operation with the centrally disposed spacing plate. The plate 168, shown in detail in Fig. 14, is similar to that shown in Fig. 11, except that the apertures 169 in the two plates are differently spaced. By replacing one of the plates 168 with the other and substituting spacing plates 63ª of a different thickness, the tabulator mechanism may be arranged to accord with the different characters of letter space movements of the carriage determined by the character of the escapement mechanism employed, as in the previously described construction. It will be understood that the insertion of the bearing portions of actuating members 73ª in the bearing apertures of one or the other of the plates 168 is effective to produce a corresponding spacing of said actuating members, so that the upright arms 75ª thereof will properly co-act with the denominational stops when the latter are spaced apart according to the spacing plate 168 employed in the machine.

The operation of the mechanism illustrated in Figs. 11 to 17 inclusive, will be understood, it is believed, from the foregoing description, the operation, generally speaking, being similar to the construction disclosed in the preceding figures, except for the withdrawal of the denominational stops rearwardly and in the direction of letter feed movement of the carriage, and except for the operation under certain conditions of the releasing member 158 against the power of the spring 166 to prevent a blocking of the means by which an automatic restoration of the carriage to the control of the escapement mechanism is effected.

Various changes may be made without departing from the spirit and scope of my invention.

What I claim as new and desire to secure by Letters Patent, is:—

1. In a typewriting machine, the combination of a carriage; and tabulating mechanism operative to arrest the carriage at the same letter space position during both forward and reverse tabulation, said tabulating mechanism comprising a series of denominational stops, a series of key controlled nested actuating members for said stops, and means for affording a limited bodily movement of said denominational stops and nested members with the carriage in the travel of the latter in one direction.

2. In a typewriting machine, the combination of a carriage; and tabulating mechanism operative to arrest the carriage at the same letter space position during both forward and reverse tabulation, said tabulating mechanism comprising a housing mounted on the top plate of the machine in the rear of the carriage and having a limited movement in the direction of the travel of the carriage and in one direction from the normal position, a stop carried by said housing, and an actuating device which is separate from but which coöperates with said stop to control its operation, said actuating device being carried by and movable with the housing.

3. In a typewriting machine, the combination of a carriage; and tabulating mechanism operative to arrest the carriage at the same letter space position during both forward and reverse tabulation, said tabulating mechanism comprising a housing mounted on the top plate of the machine in the rear of the carriage and having a limited movement in the direction of the travel of the carriage and in one direction from the normal position, a stop carried by said housing, an actuating device which is separate from but which coöperates with said stop to control its operation, said actuating device being carried by and movable with the housing, and a carriage releasing device carried by said housing and movable therewith, the operation of said releasing device being controlled by said stop.

4. In a typewriting machine, the combination of a carriage; and tabulating mechanism operative to arrest the carriage at the same letter space position during both forward and reverse tabulation, said tabulating mechanism comprising a housing mounted on the top plate of the machine in the rear of the carriage and having a limited movement in the direction of the travel of the carriage and in one direction from the normal position, a stop carried by said housing, an actuating device which is separate from but which coöperates with said stop to control its operation, said actuating device being carried by and movable with the housing, a carriage releasing device carried by said housing and movable therewith, the operation of said releasing device being controlled by said stop, and a second carriage releasing device carried by the frame of the machine and with which said first mentioned releasing device is operatively connected, a disconnection between said releasing devices being effected by a movement of said housing from its normal position.

5. In a typewriting machine, the combination of a carriage; and tabulating mechanism operative to arrest the carriage at the same letter space position during both forward and reverse tabulation, said tabulating mechanism comprising a housing mounted on the top plate of the machine in the rear of the carriage and having a limited movement in the direction of the travel of the carriage and in one direction from the normal position, a stop carried by said housing, an actuating device which is separate from but which coöperates with said stop to control its operation, said actuating device being carried by and movable with the housing, a carriage releasing device carried by said housing and movable therewith, the operation of said releasing device being controlled by said stop, a second carriage releasing device carried by the housing and controlled by said first mentioned device, and a third carriage releasing device carried by the frame of the machine and with which said second releasing device is coöperative, a disconnection between said second and third releasing devices being effected by a movement of the housing from its normal position.

6. In a typewriting machine, the combination of a carriage; and tabulating mechanism operative to arrest the carriage at the same letter space position during both forward and reverse tabulation, said tabulating mechanism comprising a housing mounted on the top plate of the machine in the rear of the carriage and having a limited movement in the direction of the travel of the carriage and in one direction from the normal position, a series of key controlled denominational stops carried by said housing, a universal releasing bar carried by and movable with said housing and controlled by said denominational stops, and carriage releasing means carried by the frame of the machine and normally operatively connected with and controlled by said universal releasing bar, a disconnection between the universal releasing bar and said releasing means being effected by a movement of the housing from its normal position.

7. In a typewriting machine, the combination of a carriage; and tabulating mechanism operative to arrest the carriage at the same letter space position during both forward and reverse tabulation, said tabulating mechanism comprising a housing mounted on the top plate of the machine in the rear of the carriage and having a limited movement in the direction of the travel of the carriage and in one direction from the normal position, a series of pivoted actuating devices contained in and carried by said housing, a series of denominational stops carried by said housing and controlled by said actuating devices, a universal releasing bar carried by and movable with said housing and controlled by said denominational stops, and carriage releasing means carried by the frame of the machine and normally operatively connected with and controlled by said universal releasing bar, a disconnection between the universal releasing bar and said releasing means being effected by a movement of the housing from its normal position.

8. In a typewriting machine, the combination of a carriage; tabulating mechanism operative to arrest the carriage in a direction opposite to that of its letter feed movement; and means for releasing the carriage when said tabulating mechanism is actuated, said releasing means comprising two coöperative actuating members one of which is mounted to receive three separate and distinct movements, one a movement to release the carriage, another to disconnect it from its coöperative member and a third to prevent a blocking of the releasing operation by a premature reëngagement between said members.

9. In a typewriting machine, the combination of a carriage; tabulating mechanism operative to arrest the carriage in a direction opposite to that of its letter feed movement; and means for releasing the carriage when said tabulating mechanism is actuated, said releasing means comprising two coöperative actuating members one of which is mounted to receive three separate and distinct movements, one a longitudinal movement to release the carriage, another a bodily movement with the part that carries it in order to disconnect one of said members from the other, and the third a pivotal movement to prevent a blocking of the releasing operation by a premature reëngagement between said members.

10. In a typewriting machine, the combination of a carriage; escapement mechanism therefor; carriage releasing means; and tabulating mechanism comprising a tabulating stop, a tabulator key the actuation of which is effective to operate the carriage releasing means, an actuating member for said stop, said actuating member being controlled by said key and having bearing portions at one edge thereof, a recessed bearing piece adapted to receive in the recesses therein the bearing portions of said actuating member, means for affording a bodily movement of said stop and actuating member in the direction of the travel of the carriage, and means by which said bodily movement of the stop and actuating member is effective to automatically restore the carriage to the control of the escapement mechanism.

11. In a typewriting machine, the combination of a carriage; and tabulator mechanism comprising a tabulator key at the front of the machine, a tabulator stop arranged at the rear of the machine and wholly above the top, and intermediate actuating connections between said key and stop, said connections including a pivoted member arranged above the top plate of the machine and the pivotal axis of which extends in the general direction of the travel of the carriage, said member being provided with widely separated or off-set crank arms which project from the pivoted portion thereof, one of said arms being connected with the stop and the other arm being connected with said key.

12. In a typewriting machine, the combination of a carriage; and tabulator mechanism comprising a series of tabulator keys at the front of the machine, a series of tabulator stops arranged at the rear of the machine and wholly above the top plate thereof, and intermediate actuating connections between said keys and stops, said connections including a series of nested pivoted members arranged above the top plate.

13. In a typewriting machine, the combination of a carriage; and tabulator mechanism comprising a series of tabulator keys at the front of the machine, a series of tabulator stops arranged at the rear of the machine, and intermediate actuating connections between said keys and stops, said connections including a series of members each of which is mounted for detachment independently of other of said members.

14. In a typewriting machine, the combination of a carriage; and tabulator mechanism comprising a series of tabulator keys at the front of the machine, a series of tabulator stops arranged at the rear of the machine, intermediate actuating connections between said keys and stops, said connections including a series of nested pivoted members, and a movably mounted support which carries said nested members and stops, said support having a limited movement in one direction from its normal position and in the general direction of the travel of the carriage in order to enable the carriage to be arrested at the same letter space position in both forward and reverse tabulation.

15. In a typewriting machine, the combination of a carriage; and tabulating mechanism comprising a tabulating stop, a pivoted key controlled actuating member for said stop, said member being formed with bearing portions at one edge thereof, and a recessed bearing piece adapted to receive in the recesses therein the bearing portions of said actuating member.

16. In a typewriting machine, the combination of a carriage; and tabulating mechanism comprising a tabulating stop, a pivoted key controlled actuating member for said stop, said member being formed from sheet metal with a central body portion having bearing portions at one edge thereof and also having crank arms projecting therefrom, and a recessed bearing piece adapted to receive in the recesses therein the bearing portions of said actuating member.

17. In a typewriting machine, the combination of a carriage; and tabulating mechanism comprising a series of tabulating stops, a series of pivoted key controlled nested actuating members for said stops, each of said key controlled members being formed with bearing portions at one edge thereof, and a recessed bearing piece adapted to receive in the recesses therein the bearing portions of said actuating members.

18. In a typewriting machine, the combination of a carriage; and tabulating mechanism comprising a series of tabulating stops, a series of pivoted key controlled nested actuating members for said stops, each of said key controlled members being formed from sheet metal with a central body portion having bearing projections at one edge thereof and also having crank arms projecting therefrom, and a recessed bearing piece adapted to receive in the recesses therein the bearing projections of said actuating members.

19. In a typewriting machine, the combination of a carriage; and tabulating mechanism comprising a tabulating stop, a pivoted key controlled actuating member for said stop, said member being formed with bearing portions at one edge thereof, a recessed bearing piece adapted to receive in the recesses therein the bearing portions of said actuating member, and a movably mounted support for said actuating member, stop and bearing piece, said support having a limited movement in one direction from its normal position and in the general direction of the travel of the carriage in order to enable the carriage to be arrested at the same letter space position in both forward and reverse tabulation.

20. In a typewriting machine, the combination of a carriage; and tabulating mechanism comprising a series of tabulating stops, a series of pivoted key controlled nested actuating members for said stops, each of said key controlled members being formed with bearing portions at one edge thereof, a recessed bearing piece adapted to receive in the recesses therein the bearing portions of said actuating members, and a movably mounted support for the actuating members, tabulating stops and bearing piece, said support having a limited movement in one direction from its normal position and in the general direction of the travel of the carriage in order to enable the carriage to be arrested at the same letter space position in both forward and reverse tabulation.

21. In a typewriting machine, the combination of a carriage; and tabulating mechanism comprising a series of tabulating stops, a series of pivoted key controlled nested actuating members for said stops, each of said key controlled members being formed from sheet metal with a central body portion having bearing projections at one edge thereof and also having crank arms projecting therefrom, a recessed bearing piece adapted to receive in the recesses therein the bearing projections of said actuating members, and a movably mounted support for the actuating members, tabulating stops and bearing piece, said support having a limited movement in one direction from its normal position and in the general direction of the travel of the carriage in order to enable the carriage to be arrested at the same letter space position in both forward and reverse tabulation.

22. In a typewriting machine, the combination of a carriage; and denominational tabulating mechanism comprising denominational stops, means enabling said stops to be adjusted to correspond to the letter space feed of the carriage, and means for keeping said stops so adjusted, this means including demountable spacing plates interposed between said denominational stops and replaceable by plates of a different thickness.

23. In a typewriting machine, the combination of a carriage; and denominational tabulating mechanism comprising denominational stops, means enabling said stops to be adjusted to correspond to the letter space feed of the carriage, means for keeping said stops so adjusted, actuating devices for said denominational stops, means enabling said actuating devices to be adjusted to correspond to the spacing of said denominational stops, and means for keeping said actuating devices so adjusted, this means including a plate by which the spacing of said actuating devices is maintained and which is replaceable by another plate.

24. In a typewriting machine, the combination of a carriage; and denominational tabulating mechanism comprising denominational stops, means enabling said stops to be adjusted to correspond to the letter space feed of the carriage, means for keeping said stops in their adjusted positions, actuating devices for said denominational stops, means enabling said actuating devices to be adjusted to correspond to the spacing of said denominational stops, and means for keeping said actuating devices so adjusted, this means including a plate by which the spacing of said actuating devices is maintained and which is apertured to provide bearing openings for said actuating devices and from which the actuating devices are demountable, said plate being replaceable by another plate.

25. In a typewriting machine, the combination of a carriage; and tabulating mechanism comprising tabulating keys, stops controlled by said keys, pivoted actuating devices intermediate said keys and stops, and means by which said actuating devices may be readily assembled in or demounted from the machine, said last mentioned means including an apertured plate in the apertures of which the said devices may be seated for pivotal movement and from which said devices may be withdrawn.

26. In a typewriting machine, the combination of a carriage; and tabulating mechanism comprising tabulating keys, stops controlled by said keys, intermediate actuating connections between said keys and stops, said connections including pivoted actuating members, and seats in which said members are received and mounted for pivotal movement and from which said members may be lifted and removed.

27. In a typewriting machine, the combination of a carriage; and tabulating mechanism comprising tabulating keys, stops controlled by said keys, intermediate actuating connections between said keys and stops, said connections including pivoted actuating members, and a detachable plate having seats formed therein and in which seats the actuating members are received and mounted for pivotal movement and from which said members may be lifted and removed, so that differently spaced plates may be substituted one for another and the actuating members may be spaced accordingly.

28. In a typewriting machine, the combination of a carriage; and tabulating mechanism comprising tabulator stops adapted to co-act with each other to arrest the carriage, said stops being relatively movable into and out of coöperative relation and the disengagement between them being effected by a movement of one of said stops in a plane at an angle to the contact face of the other stop with which it co-acts.

29. In a typewriting machine, the combination of a carriage; and tabulating mechanism comprising two coöperative tabulator stops so arranged that the plane of one of said stops is at an angle to the plane of the other, and one of said stops moving in its plane into and out of coöperation with the other stop, the stops when in carriage arresting engagement being so disposed that one of said stops is at an oblique angle to the other.

30. In a typewriting machine, the combination of a carriage; and tabulating mechanism comprising a tabulator stop, a second key controlled tabulator stop coöperative with said first mentioned stop and movable into and out of coöperative relation therewith in a plane which is at an angle to the contact face of the first mentioned stop, the key controlled stop engaging only with a side of the first mentioned stop.

31. In a typewriting machine, the combination of a carriage; and tabulating mechanism comprising a tabulator stop, and a second key controlled tabulator stop movable into and out of coöperative relation with said first mentioned stop in a plane which is at an angle to a vertical fore and aft plane extending centrally through the machine and engaging only with a side of the first mentioned stop.

32. In a typewriting machine, the combination of a carriage; and tabulating mechanism comprising a column stop, and a series of denominational stops each movable into and out of coöperative relation with said column stop in a plane inclined to the plane of the working face of said column stop, said working face being at right angles to the direction of travel of the carriage.

33. In a typewriting machine, the combination of a carriage; and tabulating mechanism comprising a column stop, and a series of denominational stops each movable into and out of coöperative relation with said column stop and moving away from and toward the left-hand side of the machine when disengaging said column stop, each denominational stop engaging only with a side of the column stop.

34. In a typewriting machine, the combination of a carriage; and tabulating mechanism comprising a column stop, having a working face at right angles to the direction of travel of the carriage, and a series of parallel denominational stops mounted to move fore and aft of the machine into and out of coöperative relation with said column stop, each denominational stop moving in a vertical plane which is at an angle to a vertical plane extending fore and aft of the machine and engaging only with said working face of the column stop.

35. In a typewriting machine, the combination of a carriage; and tabulating mechanism comprising a tabulator stop, a key controlled coöperative tabulator stop, and a pivoted actuating device for controlling said coöperative stop, the pivotal axis of said actuating device being inclined relatively to the path of movement of the carriage, said coöperative stop being movable in a plane at right angles to the axis of said actuating device.

36. In a typewriting machine, the combination of a carriage; and tabulating mechanism comprising a column stop, a series of denominational stops, and a plurality of nested pivoted actuating devices for said denominational stops, the pivotal axis of each of said actuating devices being inclined relatively to the path of movement of the carriage, each of said denominational stops being movable in a plane at right angles to the axis of the associated actuating device.

37. In a typewriting machine, the combination of a carriage; and tabulating mechanism comprising a tabulator stop, a key head for controlling said stop, an apertured guide in which said key head works, and a stop on the inner end of the key head which co-acts with said guide to limit the movement of the key head in the guide in one direction.

38. In a typewriting machine, the combination of a carriage; and tabulating mechanism comprising a tabulator stop, a key head for controlling said stop, said key head being formed with a spring receiving opening therein, a spring in said opening, and an apertured guide in which said key head works and against which the power of the spring is exerted.

39. In a typewriting machine, the combination of a carriage; and tabulating mechanism comprising a tabulator stop, a key head for controlling said stop, said key head being formed with a spring receiving opening therein, a spring in said opening, an apertured guide in which said key head works and against which the power of the spring is exerted at one end of the latter, the opposite end of the spring bearing against the key head, and a stop on the key head which co-acts with said guide to limit the movement of the key head in one direction and under the action of said spring.

40. In a typewriting machine, the combination of a carriage; and tabulating mechanism comprising a tabulator stop, a key head for controlling said stop, said key head being in the nature of a headed cylinder, a spring in said key head, an actuating rod having a threaded connection with said key head and which is surrounded by said spring, and a guide having an aperture therein in which said key head works.

41. In a typewriting machine, the combination of a carriage; and tabulating mechanism comprising a tabulator stop, a key head for controlling said stop, an actuating rod connected with said key head, and a substantially U-shaped guide one side of which is apertured to receive and guide the key head and the other side of which is apertured for the free passage of said actuating rod therethrough.

42. In a typewriting machine, the combination of a carriage; and tabulating mechanism comprising a tabulator stop, a key head for controlling said stop, an actuating rod connected with said key head, a substantially U-shaped guide one side of which is apertured to receive and guide the key head and the other side of which is apertured for the free passage of said actuating rod therethrough, and a stop on the key head which co-acts with one side of the guide to limit the movement of the key head in one direction.

43. In a typewriting machine, the combination of a carriage; and tabulating mechanism comprising a tabulator stop, a key head for controlling said stop, one end of said key head being larger than the other, and a substantially U-shaped guide apertured in both sides thereof, the aperture in one side of the guide being of a size sufficient to receive the smaller end portion of the key head and to prevent the larger end portion of said head from passing therethrough and the aperture in the other side of the guide being of a size sufficient to enable the larger end portion of the key head to pass therethrough.

44. In a typewriting machine, the combination of a carriage; and tabulating mechanism comprising a tabulator stop, a key head for controlling said stop, one end of said key head being larger than the other, a substantially U-shaped guide apertured in both sides thereof, the aperture in one side of the guide being of a size sufficient to receive the smaller end portion of the key head and to prevent the larger end portion of said head from passing therethrough and the aperture in the other side of the guide being of a size sufficient to enable the larger end portion of the key head to pass therethrough, a detachable member received in said U-shaped guide, and a spring bearing at one end against said member and at its opposite end against said key head.

45. In a typewriting machine, the combination of a carriage; and tabulating mechanism comprising a tabulator stop, a key head for controlling said stop, the inner end of said key head being provided with an outwardly projecting flange thereon, and a substantially U-shaped guide apertured in both sides thereof, the aperture in one side of said guide being of a size sufficient to receive the body portion of the key head and to prevent the flange from passing therethrough and the aperture in the other side of the guide being of a size sufficient to enable the flange on the key head to pass therethrough.

46. In a typewriting machine, the combination of a carriage; and tabulating mechanism comprising a tabulator stop, a key head for controlling said stop, the inner end of said key head being provided with an outwardly projecting flange thereon, a substantially U-shaped guide apertured in both sides thereof, the aperture in one side of said guide being of a size sufficient to receive the body portion of the key head and to prevent the flange from passing therethrough and the aperture in the other side of the guide being of a size sufficient to enable the flange on the key head to pass therethrough, an actuating rod having a threaded connection with said key head, a detachable plate received in said guide, and a coiled expansion spring surrounding said rod and bearing at one end against said plate and at its opposite end against said key head.

47. In a typewriting machine, the combination of a carriage; and tabulating mechanism comprising a series of tabulator stops, key heads for controlling said stops, and a guide in which said key heads work and by which they are guided, said guide having parallel walls with pairs of alined apertures therein, one aperture of each pair being of sufficient size to receive and permit a limited extent of movement of a key head therein in one direction and the other aperture of each pair being of sufficient size to permit a key head to pass entirely therethrough.

48. In a typewriting machine, the combination of a carriage; and tabulating mechanism comprising a series of tabulator stops, key heads for controlling said stops, a guide in which said key heads work and by which they are guided, said guide having parallel walls with pairs of alined apertures therein, one aperture of each pair being of sufficient size to receive and permit a limited extent of movement of a key head therein in one direction and the other aperture of each pair being of sufficient size to permit a key head to pass entirely therethrough, a plate which extends substantially throughout the length of said guide and which is received between the parallel walls thereof, and a series of springs one for each key head and each spring bearing at one end against said plate and at its opposite end against the associated key head.

49. In a typewriting machine, the combination of a carriage; and tabulating mechanism comprising a series of tabulator stops, key heads for controlling said stops, a guide in which said key heads work and by which they are guided, said guide having parallel walls with pairs of alined apertures therein, one aperture of each pair being of sufficient size to receive and permit a limited extent of movement of a key head therein in one direction and the other aperture of each pair being of a sufficient size to permit a key head to pass entirely therethrough, an actuating rod connected to each key head, an apertured detachable plate received between the parallel walls of said guide, one of said connecting rods passing through each aperture in said plate, and a coiled expansion spring surrounding each actuating rod and bearing at one end against said apertured plate and at its opposite end against the associated key head.

50. In a typewriting machine, the combination of a carriage; and tabulating mechanism comprising a series of tabulator stops, key heads for controlling said stops, each of said key heads being in the nature of a cylinder having a closed end and an outwardly projecting flange at the opposite end, a guide in which said key heads work and by which they are guided, said guide having parallel walls with pairs of alined apertures therein, one aperture of each pair being of sufficient size to receive a key head but prevent the flange from passing therethrough and the other aperture of each pair being of sufficient size to enable the key head and its flange to pass therethrough, and a spring contained in each key head and bearing at one end against the associated key head, one of said parallel walls of the guide resisting the action of the springs at the opposite ends thereof.

51. In a typewriting machine, the combination of a carriage; and tabulating mechanism comprising a series of tabulator stops, key heads for controlling said stops, each of said key heads being in the nature of a cylinder having a closed end and an outwardly projecting flange at the opposite end, a guide in which said key heads work and by which they are guided, said guide having parallel walls with pairs of alined apertures therein, one aperture of each pair being of sufficient size to receive a key head but prevent the flange from passing therethrough and the other aperture of each pair being of sufficient size to enable the key head and its flange to pass therethrough, an actuating rod connected to each key head, an apertured detachable plate received between the parallel walls of said guide and through the apertures in which the actuating rods extend, a coiled expansion spring surrounding each actuating rod and bearing at one end against said apertured plate and at its opposite end against the associated key head.

52. In a typewriting machine, the combination of a carriage; and tabulating mechanism comprising a sectional housing the sections of which are detachably connected, tabulator stops received and movable in said housing and removable therefrom when the sections of the housing are detached, and key controlled means operatively connected to said stops, the stops being prevented from removal from the housing when the sections of the latter are connected.

53. In a typewriting machine, the combination of a carriage; and tabulating mechanism comprising a sectional housing the sections of which are detachably connected, tabulator stops received and movable in said housing and removable therefrom when the sections of the housing are detached, and actuating devices contained within and carried by said housing and detachably connected with said stops.

54. In a typewriting machine, the combination of a carriage; and tabulating mechanism comprising a sectional housing the sections of which are detachably connected, tabulator stops received and movable in said housing and removable therefrom when the sections of the housing are detached, actuating devices contained within said housing and detachably connected with said stops, and means by which said actuating devices are detachably pivoted to the housing and are removable therefrom when the sections of the housing are detached.

55. In a typewriting machine, the combination of a carriage; and tabulating mechanism comprising a sectional housing the sections of which are detachably connected, tabulator stops received and movable in said housing, and detachable spacing plates interposed between said stops and removable from the housing when the sections are detached.

56. In a typewriting machine, the combination of a carriage; and tabulating mechanism comprising a sectional housing the sections of which are detachably connected, tabulator stops received and movable in said housing and removable therefrom when the sections of the housing are detached, and detachable spacing plates interposed between said stops and removable from the housing when the sections are detached.

57. In a typewriting machine, the combination of a carriage; and tabulating mechanism comprising a sectional housing the sections of which are detachably connected, tabulator stops received and movable in said housing and removable therefrom when the sections of the housing are detached, and actuating devices contained within said housing and detachably connected with said stops and removable from the housing when the sections of the housing are detached.

58. In a typewriting machine, the combination of a carriage; and tabulating mechanism comprising a sectional housing the sections of which are detachably connected, tabulator stops received and movable in said housing and removable therefrom when the sections of the housing are detached, detachable spacing plates interposed between said stops and removable from the housing when the sections are detached, actuating devices contained within said housing and detachably connected with said stops, and means by which said actuating devices are detachably pivoted to the housing and are removable therefrom when the sections of the housing are detached.

59. In a typewriting machine, the combination of a carriage; and tabulating mechanism comprising a sectional housing the sections of which are detachably connected, tabulator stops received and movable in said housing and removable therefrom when the sections of the housing are detached, detachable spacing plates interposed between said stops and removable from the housing when the sections are detached, actuating devices contained within said housing and detachably connected with said stops, and a spacing plate detachably connected to said housing and having seats in which the actuating devices are received and adapted to have a pivotal movement and from which said actuating devices may be removed when the sections of the housing are detached.

60. In a typewriting machine, the combination of a carriage; escapement mechanism therefor; tabulator mechanism comprising means for effecting an arrest of the carriage during a movement thereof in a direction opposite to that of its feed and for releasing the carriage from control of its escapement when the tabulator mechanism is actuated; and automatically operating means for restoring the carriage to the control of its escapement mechanism at about the time when it is arrested in such backward tabulation, said last mentioned means including means for preventing such a premature reengagement between parts thereof as will prevent the carriage from being automatically restored to control of the escapement mechanism.

61. In a typewriting machine, the combination of a carriage; escapement mechanism therefor; and tabulating mechanism operative to arrest the carriage at the same position in both forward and backward tabulation, said mechanism comprising a tabulator stop, a second key controlled tabulator stop movable into and out of coöperative relation with said first mentioned stop, means for releasing the carriage from control of the escapement mechanism, on the actuation of said key controlled stop, and automatically operating means for restoring the carriage to the control of the escapement mechanism at backward tabulation, said last mentioned means including means for preventing such a premature engagement between different parts thereof as will prevent the carriage from being automatically restored to the control of the escapement mechanism.

62. In a typewriting machine, the combination of a carriage; escapement mechanism therefor; tabulator mechanism comprising means for effecting an arrest of the carriage during a movement thereof in a direction opposite to that of its feed; actuating connections for releasing the carriage from control of the escapement mechanism when the tabulating mechanism is actuated; automatically operating means for effecting a disconnection between said connections at about the time when the carriage is arrested at backward tabulation, in order to restore the carriage to the control of said escapement mechanism; and means for preventing such a premature reëngagement between the disconnected members of said connections as will prevent said automatic restoration of the carriage to the control of the escapement mechanism.

63. In a typewriting machine, the combination of a carriage; escapement mechanism therefor; tabulator mechanism comprising means for effecting an arrest of the carriage during a movement thereof in a direction opposite to that of its feed; actuating connections for releasing the carriage from control of the escapement mechanism when the tabulating mechanism is actuated, said connections including a pin and a member which is adapted to engage said pin; automatically operating means for tripping said member off said pin at about the time when the carriage is arrested in backward tabulation in order to restore the carriage to control of the escapement mechanism; and means for preventing such a premature reengagement between said member and pin as will prevent the restoration of the carriage to control of the escapement mechanism.

64. In a typewriting machine, the combination of a carriage; escapement mechanism therefor; tabulator mechanism comprising means for effecting an arrest of the carriage during a movement thereof in a direction opposite to that of its feed; actuating connections for releasing the carriage from control of the escapement mechanism when the tabulating mechanism is actuated, said connections including a pin and a member which is adapted to engage said pin; automatically operating means for tripping said member off said pin at about the time when the carriage is arrested in backward tabulation, in order to restore the carriage to control of the escapement mechanism; and means for affording a rocking movement of said member independently of its tripping and releasing movements, in order to prevent such a premature reëngagement between said member and pin as will prevent said automatic restoration of the carriage to control of the escapement mechanism.

65. In a typewriting machine, the combination of a carriage; escapement mechanism therefor; tabulator mechanism comprising means for effecting an arrest of the carriage during a movement thereof in a direction opposite to that of its feed; actuating connections for releasing the carriage from control of the escapement mechanism when the tabulating mechanism is actuated, said connections comprising a two-part clutch, a pin operatively connected to one of said clutch members, a releasing member adapted to engage said pin, said releasing member having a releasing movement, also a tripping movement to disengage the pin and enable a reëngagement of the clutch members to be effected independently of the return movement of said releasing member, the releasing member also being capable of receiving a third movement so as to prevent such a premature reëngagement between said releasing member and pin as will prevent a reëngagement between the clutch members when the pin is released.

66. In a typewriting machine, the combination of a carriage; escapement mechanism therefor; tabulator mechanism comprising means for effecting an arrest of the carriage during a movement thereof in a direction opposite to that of its feed; actuating connections for releasing the carriage from control of the escapement mechanism when the tabulating mechanism is actuated, said connections comprising two members which move together when releasing the carriage and which are automatically disconnected at about the time the carriage is arrested in backward tabulation, one of said members being mounted so as to be deflected from its normal relation should the two members prematurely reëngage, thereby insuring an automatic restoration of the carriage to the control of the escapement mechanism, and a spring which tends to maintain the said deflectable member in its normal relation and against the power of which spring said member is deflected as specified.

67. In a typewriting machine, the combination of a carriage; and tabulating mechanism comprising tabulator stops, key actuated devices therefor, and a housing for said stops and devices, said housing including a body portion and a cover plate detachably connected to the body portion of said housing.

68. In a typewriting machine, the combination of a carriage; and tabulating mechanism comprising tabulator stops, key actuated devices therefor, and a housing for said stops and devices, said housing including a trough-like body portion closed at the bottom and sides thereof, and cover plates which are detachably connected to the body portion of the housing and close the top and ends thereof.

69. In a typewriting machine, the combination of a carriage; and tabulating mechanism comprising tabulator stops, key actuated devices therefor, and a housing for said stops and devices, said housing including a body portion which is substantially U-shaped in cross section, detachable cover plates which close the ends and parts of the top of said body portion, and an additional cover plate detachably connected to the body portion of the housing and closing the remainder of the top of the body portion.

70. In a typewriting machine, the combination of a carriage; and tabulating mechanism comprising tabulator stops, key actuated devices therefor, and a housing for said stops and devices, said housing including a body portion which is substantially U-shaped in cross section, cover plates which close the ends and parts of the top of said body portion and which are detachably hinged to the body portion, and a centrally located detachable cover plate which retains the first mentioned cover plates in position.

71. In a typewriting machine, the combination of a carriage; and tabulating mechanism comprising tabulator stops, key actuated devices therefor, and a housing for said stops and devices, said housing including a body portion which is substantially U-shaped in cross section, cover plates which close the ends and parts of the top of said body portion and which are detachably hinged to the body portion, and a centrally located detachable cover plate which retains the first mentioned cover plates in position, adjacent edges of the body portion of the housing and said centrally located cover plate being cut out to receive said stops and enable them to project from the housing.

72. In a typewriting machine, the combination of a carriage; and tabulating mechanism comprising tabulator stops, and a housing in which said stops are received and adapted to work and from which they project, said housing comprising a body portion and a detachable cover plate one at least of said parts being cut out in order to receive the stops and enable them to project from the housing, and detachable spacing plates between said stops, a detachment of the cover plate enabling the stops and spacing plates to be removed from the housing.

73. In a typewriting machine, the combination of a carriage; and tabulating mechanism comprising tabulator stops, and a housing in which said stops are received and adapted to work and from which they project, said housing comprising a body portion and a detachable cover plate one at least of said parts being cut out in order to receive the stops and enable them to project from the housing, the length of each cut-out corresponding to the width of the entire series of stops, and detachable spacing plates interposed between said stops and engaging the inner walls of said body portion of the housing to prevent longitudinal displacement of the spacing plates, a detachment of said cover plate enabling the stops and spacing plates to be removed from the housing.

74. In a typewriting machine, the combination of tabulating mechanism comprising a series of tabulator stops, a series of key controlled actuating devices therefor, and pivot bearings for said actuating devices, said bearings having an echelon arrangement.

75. In a typewriting machine, the combination of tabulating mechanism comprising a series of tabulator stops, a series of key controlled actuating devices therefor having an echelon arrangement, and a detachable plate having pivot-bearings for said actuating devices, said bearings having an echelon arrangement.

76. In a typewriting machine, the combination of tabulating mechanism comprising a series of tabulator stops, a carrier therefor, a series of key controlled actuating devices for said stops, said actuating devices being carried by said carrier and having an echelon arrangement, and a plate detachably connected with said carrier and having pivot bearings in echelon arrangement and in which bearings the actuating devices are seated for pivotal movement and from which they may be removed.

77. In a typewriting machine, the combination of a carriage; and tabulating mechanism comprising a series of tabulator stops, and a series of key operated pivoted nested actuating devices therefor, each of said actuating devices being formed from sheet metal and having a pivotal support at one edge of its sheet metal body portion.

78. In a typewriting machine, the combination of a carriage; and tabulating mechanism comprising a series of tabulator stops, and a series of key operated pivoted nested actuating devices therefor, each of said actuating devices being formed from sheet metal and having integral crank arms extending in different directions from the body portion thereof, the crank arms of the actuating devices having a nested arrangement.

79. In a typewriting machine, the combination of a carriage; and tabulating mechanism comprising a series of tabulator stops, and a series of key operated pivoted nested actuating devices therefor, said devices having an echelon arrangement and each of them being formed from sheet metal and having a pivotal support at one edge of its sheet metal body portion.

80. In a typewriting machine, the combination of a carriage; and tabulating mechanism comprising a series of tabulator stops, and a series of key operated pivoted nested actuating devices therefor, each of said actuating devices being formed from sheet metal and having an elongated flat body portion pivotally supported at one edge thereof and with widely separated integral crank arms which extend from the body portion at substantially right angles thereto.

81. In a typewriting machine, the combination of a carriage; and tabulating mechanism comprising a detachable tabulator housing the body portion of which is formed from a single piece of sheet metal and which is provided with detachable sheet metal cover plates, and sheet metal tabulator stops and actuating devices contained within and supported by said housing and detachable therewith.

82. In a typewriting machine, the combination of a carriage and denominational tabulating mechanism comprising denominational stops which are adjustable laterally so as to accord in spacing with the letter space feed movements of the carriage, and actuating devices which are adjustable laterally for proper coöperation with said denominational stops.

83. In a typewriting machine, the combination of a carriage and denominational tabulating mechanism comprising a series of independent denominational stops laterally adjustable to accord in spacing with the letter space movements of the carriage, means for holding said stops so adjusted, and a series of laterally adjustable actuators for said adjustable denominational stops, and means for holding said actuators in working relations when so adjusted.

Signed at the borough of Manhattan, city of New York, in the county of New York, and State of New York, this 27th day of April, A. D. 1914.

JOHN H. BARR.

Witnesses:
CHARLES E. SMITH,
L. NELSON.